(12) United States Patent
Ehara et al.

(10) Patent No.: US 12,158,739 B2
(45) Date of Patent: Dec. 3, 2024

(54) ELECTRIC POWER MANAGEMENT SYSTEM, ELECTRIC POWER MANAGEMENT SERVER, AND ELECTRIC POWER MANAGEMENT METHOD

(71) Applicant: TOYOTA JIDOSHA KABUSHIKI KAISHA, Toyota (JP)

(72) Inventors: Masato Ehara, Susono (JP); Rentaro Kuroki, Susono (JP); Shunsuke Kobuna, Susono (JP); Tatsuro Kiyohara, Nagoya (JP); Naohiro Seo, Sunto-gun (JP); Takaharu Tateishi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 408 days.

(21) Appl. No.: 17/715,323

(22) Filed: Apr. 7, 2022

(65) Prior Publication Data

US 2023/0004132 A1 Jan. 5, 2023

(30) Foreign Application Priority Data

Jul. 2, 2021 (JP) ................. 2021-111060

(51) Int. Cl.
*G05B 19/042* (2006.01)
*B60L 53/62* (2019.01)
(Continued)

(52) U.S. Cl.
CPC ............ *G05B 19/042* (2013.01); *B60L 53/62* (2019.02); *H02J 3/003* (2020.01); *H02J 3/004* (2020.01);
(Continued)

(58) Field of Classification Search
CPC .......... G05B 19/042; G05B 2219/2639; B60L 53/62; H02J 3/322; H02J 3/003; H02J 3/004; H02J 7/342; H02J 7/0013
(Continued)

(56) References Cited

U.S. PATENT DOCUMENTS 9,026,347 B2 * 5/2015 Gadh ..................... B60L 53/67
320/132
2010/0145540 A1 * 6/2010 McKenna ............ B60L 53/665
700/295
(Continued)

FOREIGN PATENT DOCUMENTS

JP 2012-048286 A 3/2012
JP 2014-514638 A 6/2014
(Continued)

*Primary Examiner* — Md Azad
(74) *Attorney, Agent, or Firm* — Finnegan, Henderson, Farabow, Garrett and Dunner, LLP

(57) ABSTRACT

An electric power management system is a system that performs an exchange of electric power with an electric power system of an electric power company that is a counterparty of the exchange of the electric power, and includes a plurality of the vehicles, each including a battery, and a server that manages an exchange of the electric power between the battery of each of the vehicles and the electric power system. The server manages the exchange of the electric power for each vehicle group in which the vehicles are bundled, and configures the vehicle groups in advance such that distributions of the electric power supply and demand characteristics of the batteries of the vehicles included in the vehicle groups are the same or similar.

7 Claims, 7 Drawing Sheets

(51) Int. Cl.
*H02J 3/00* (2006.01)
*H02J 3/32* (2006.01)
*H02J 7/00* (2006.01)
*H02J 7/34* (2006.01)

(52) U.S. Cl.
CPC ............ *H02J 3/322* (2020.01); *H02J 7/0013* (2013.01); *H02J 7/342* (2020.01); *G05B 2219/2639* (2013.01)

(58) Field of Classification Search
USPC ........................................................ 700/295
See application file for complete search history.

(56) References Cited

U.S. PATENT DOCUMENTS

| | | | | |
|---|---|---|---|---|
| 2013/0015708 | A1* | 1/2013 | Ukita | ................... H02J 3/32 307/43 |
| 2013/0211988 | A1* | 8/2013 | Dorn | ................... B60L 53/65 700/297 |
| 2014/0249793 | A1* | 9/2014 | Yanami | ............. H02J 13/00002 703/18 |
| 2015/0042278 | A1* | 2/2015 | Leary | ................... B60L 1/02 901/30 |
| 2019/0164203 | A1* | 5/2019 | Malik | ................ G06Q 30/0283 |

FOREIGN PATENT DOCUMENTS

| | | |
|---|---|---|
| JP | 2014-171330 A | 9/2014 |
| WO | WO 2012/127065 A1 | 9/2012 |

* cited by examiner

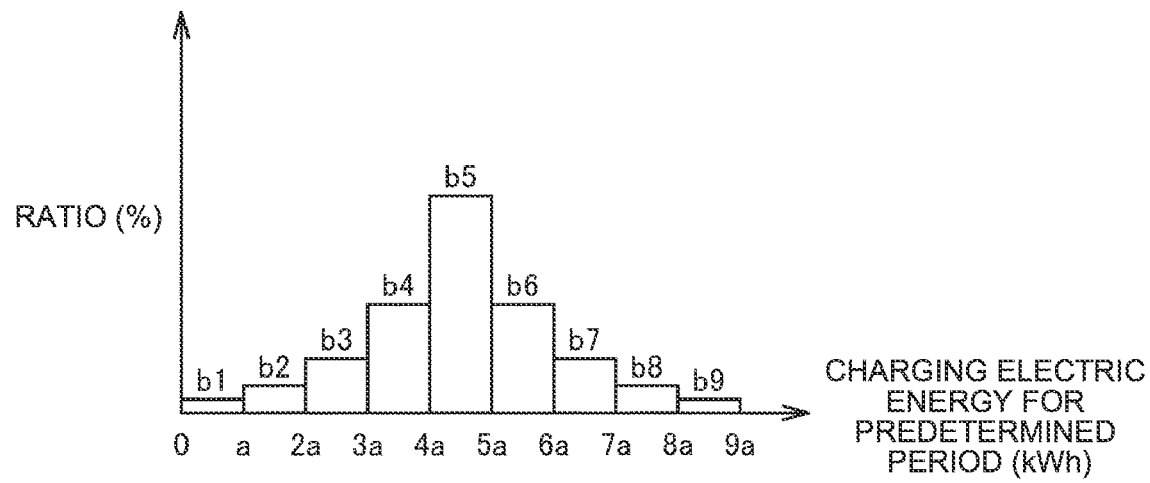
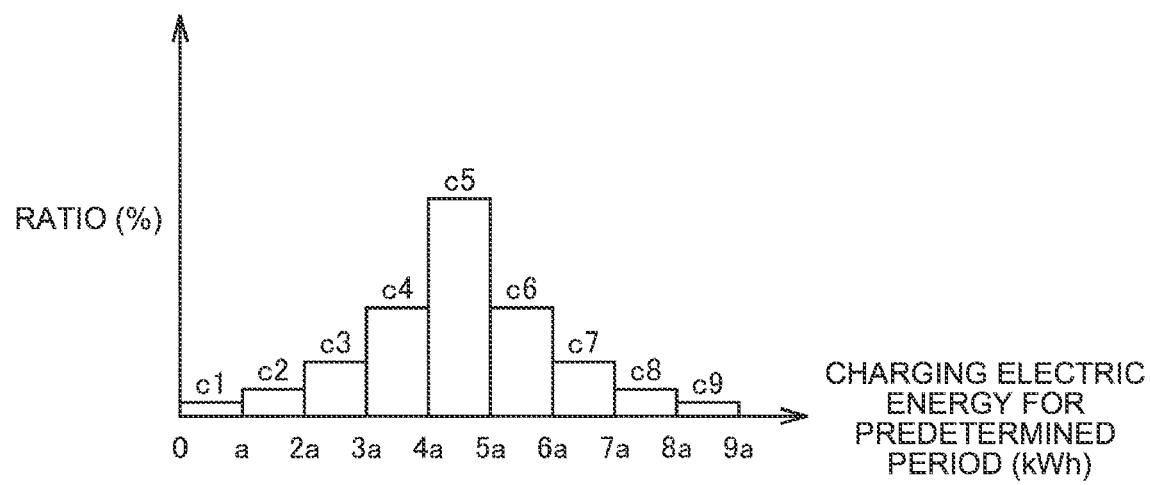

ELECTRIC POWER MANAGEMENT SYSTEM, ELECTRIC POWER MANAGEMENT SERVER, AND ELECTRIC POWER MANAGEMENT METHOD

CROSS-REFERENCE TO RELATED APPLICATION

This application claims priority to Japanese Patent Application No. 2021-111060 filed on Jul. 2, 2021, incorporated herein by reference in its entirety.

BACKGROUND

1. Technical Field

The present disclosure relates to an electric power management system, an electric power management server, and an electric power management method, and in particular, to an electric power management system, an electric power management server, and an electric power management method for exchanging electric power with an electric system of a counterparty of the exchange of the electric power.

2. Description of Related Art

In the related art, an electric power system stabilization system is known in which, to distribute the total charging electric power that needs to be consumed by charging stands in each electric power distribution area to the required number of battery electric vehicles so as to cause the battery electric vehicles to consume the electric power, a charging monitoring control center collects the battery electric vehicles to be charged by the charging stands from the battery electric vehicles that are currently traveling, and distributes the total charging electric power to the required number of battery electric vehicles (for example, refer 25 to Japanese Unexamined Patent Application Publication No. 2012-48286 (JP 2012-48286 A)).

SUMMARY

However, when a virtual power plant (hereinafter referred to as "VPP") is configured using a large number of battery electric vehicles as in the system described in JP 2012-48286 A, there arises an issue that it is difficult to predict and adjust the supply and demand of the electric power.

The present disclosure is made to solve the above-mentioned issue, and an object of the present disclosure is to provide an electric power management system, an electric power management server, and an electric power management method capable of facilitating prediction and adjustment of the supply and demand of the electric power.

An electric power management system according to the present disclosure is an electric power management system that performs an exchange of electric power with an electric system of a counterparty of the exchange of the electric power, and includes: a plurality of vehicles, each including an electric power storage device; and a server that manages an exchange of the electric power between the electric power storage device of each of the vehicles and the electric system. The server manages the exchange of the electric power for each vehicle group in which the vehicles are bundled, and configures the vehicle groups in advance such that distributions of electric power supply and demand characteristics of the electric power storage devices of the vehicles included in the vehicle groups are the same or similar.

With the configuration above, the exchange of the electric power is managed for each of the vehicle groups configured in advance such that the distributions of the electric power supply and demand characteristics of the electric power storage devices of the vehicles included in the vehicle groups are the same or similar, whereby the exchange of the electric power can be managed as the average of the vehicles, compared to the case where the exchange of the electric power is managed for each of the vehicles. As a result, it is possible to provide an electric power management system capable of facilitating prediction and adjustment of the supply and demand of electric power.

The server may formulate a plan for a combination of the vehicle groups that are able to exchange the electric power in accordance with a request for the exchange of the electric power with the electric system of the counterparty, request a user of the vehicle included in the vehicle group of the combination of the formulated plan for exchanging the electric power in accordance with the request from the counterparty, and execute a process for exchanging the electric power between the electric power storage device of the vehicle of the requested user and the electric system of the counterparty.

With the configuration above, it is possible to exchange the electric power between the electric power storage device of the vehicle of the requested user and the electric system of the counterparty in accordance with the request for the exchange of the electric power with the electric system of the counterparty. As a result, it is possible to supply and demand the electric power in accordance with the request from the counterparty.

The exchange of the electric power between the electric power storage device of the vehicle and the electric system of the counterparty may be to supply the electric power from the electric power storage device to the electric system.

With the configuration above, the electric power in accordance with the request from the counterparty can be supplied to the electric system of the counterparty from the electric power storage device of the vehicle included in the vehicle group.

The exchange of the electric power between the electric power storage device of the vehicle and the electric system of the counterparty may be to reduce supply of the electric power from the electric system to the electric power storage device.

With the configuration above, supply of the electric power from the electric system of the counterparty to the electric power storage device of the vehicle included in the vehicle group can be reduced in accordance with the request from the counterparty.

The exchange of the electric power between the electric power storage device of the vehicle and the electric system of the counterparty may be to increase supply of the electric power from the electric system to the electric power storage device.

With the configuration above, supply of the electric power from the electric system of the counterparty to the electric power storage device of the vehicle included in the vehicle group can be increased in accordance with the request from the counterparty.

According to another aspect of the present disclosure, an electric power management server is an electric power management server that is included in an electric power management system for performing an exchange of electric power with an electric system of a counterparty of the exchange of the electric power, and that includes a control unit that manages an exchange of the electric power between an electric power storage device of each of a plurality of vehicles and the electric system. The control unit manages the exchange of the electric power for each vehicle group in which the vehicles are bundled, and configures the vehicle groups in advance such that distributions of electric power supply and demand characteristics of the electric power storage devices of the vehicles included in the vehicle groups are the same or similar.

With the configuration above, it is possible to provide an electric power management server capable of facilitating prediction and adjustment of the supply and demand of electric power.

According to still another aspect of the present disclosure, an electric power management method is an electric power management method executed by a server that is included in an electric power management system for performing an exchange of electric power with an electric system of a counterparty of the exchange of the electric power, and that includes a control unit that manages an exchange of the electric power between an electric power storage device of each of a plurality of vehicles and the electric system, and includes: a step in which the control unit manages the exchange of the electric power for each vehicle group in which the vehicles are bundled; and a step in which the control unit configures the vehicle groups in advance such that distributions of electric power supply and demand characteristics of the electric power storage devices of the vehicles included in the vehicle groups are the same or similar.

With the configuration above, it is possible to provide an electric power management method capable of facilitating prediction and adjustment of the supply and demand of electric power.

According to the present disclosure, it is possible to provide an electric power management system, an electric power management server, and an electric power management method capable of facilitating prediction and adjustment of the supply and demand of electric power.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5A is a histograms showing a distribution of the number of vehicles for each charging electric energy for a predetermined period that is one of the electric power supply and demand characteristics of the vehicle;

FIG. 5B is another histogram showing a distribution of the number of vehicles for each charging electric energy for a predetermined period that is one of the electric power supply and demand characteristics of the vehicle;

DETAILED DESCRIPTION OF EMBODIMENTS

Figure 1:
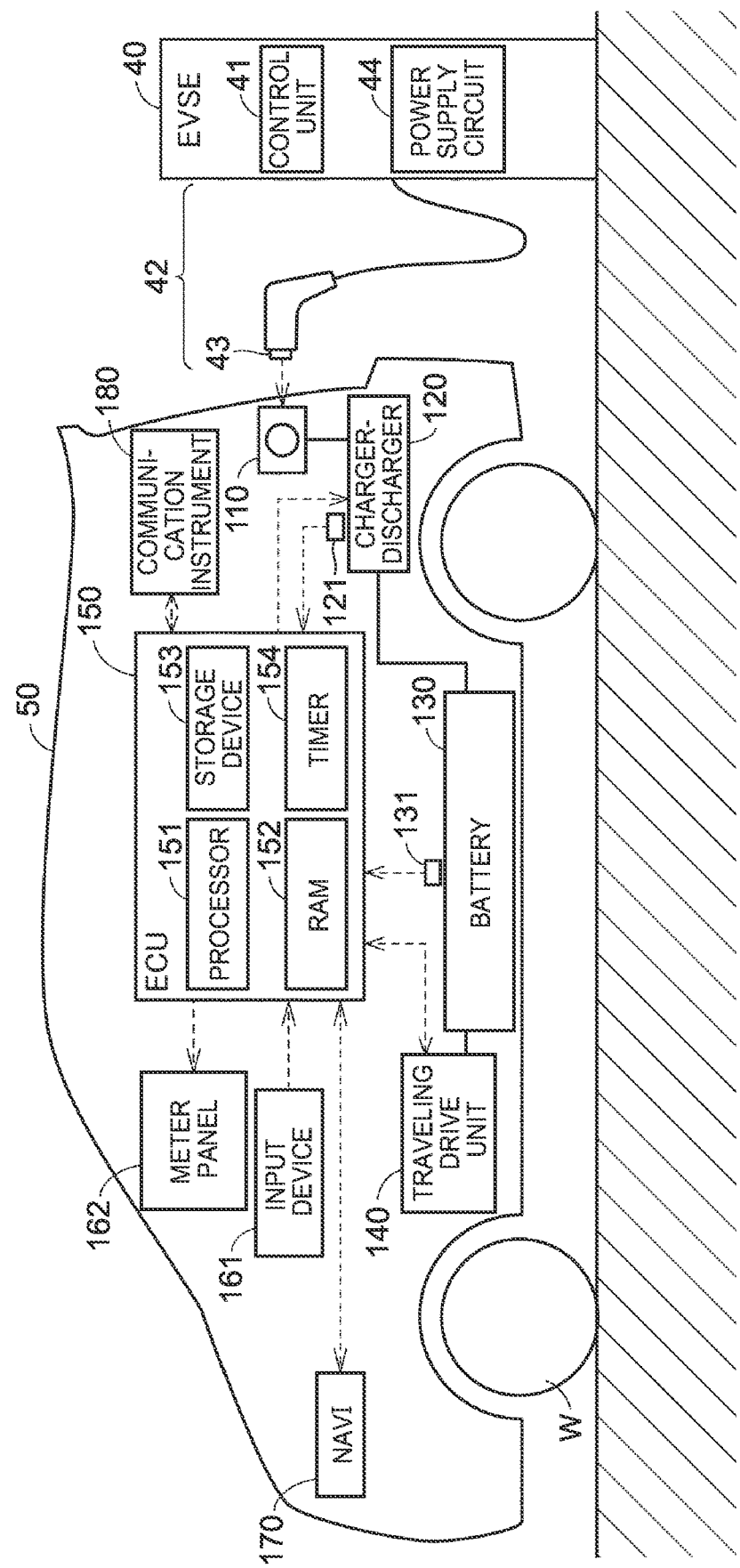
FIG. 1 is a diagram showing a configuration of a vehicle according to the present embodiment.

Hereinafter, an embodiment of the present disclosure will be described in detail with reference to the drawings. In the drawings, the same or corresponding parts are denoted by the same reference signs and the description thereof will be not be repeated. In the following descriptions, an energy management system will be referred to as an "EMS". Further, an electronic control unit mounted on the vehicle will be referred to as an "ECU".

First Embodiment

FIG. 1 is a diagram showing a configuration of a vehicle 50 according to the present embodiment. With reference to FIG. 1, the vehicle 50 includes a battery 130 that stores electric power for causing the vehicle 50 to travel. The vehicle 50 is configured to be travelable using the electric power stored in the battery 130. The vehicle 50 according to the present embodiment is a battery electric vehicle (BEV) without an engine (internal combustion engine).

The battery 130 is configured to include a secondary battery such as a lithium ion battery or a nickel metal hydride battery. In the present embodiment, as the secondary battery, an assembled battery including a plurality of lithium ion batteries is adopted. The assembled battery is composed of a plurality of secondary batteries (that is generally also referred to as "cells"). The secondary batteries are electrically connected to each other.

The vehicle 50 includes an ECU 150. The ECU 150 is configured to execute charge control and discharge control of the battery 130. Further, the ECU 150 is configured to control communication with the outside of the vehicle 50.

The vehicle 50 further includes a monitoring module 131 that monitors the state of the battery 130. The monitoring module 131 includes various sensors for detecting the state of the battery 130 (for example, voltage, current, and temperature), and outputs the detection result to the ECU 150. The monitoring module 131 may be a battery management system (BMS) having a state of charge (SOC) estimation function, a state of health (SOH) estimation function, a cell voltage equalization function, a diagnostic function, and a communication function, in addition to the above sensor function. The ECU 150 can acquire the state of the battery 130 (for example, temperature, current, voltage, SOC, and internal resistance) based on the output of the monitoring module 131.

Electric vehicle supply equipment (EVSE) 40 includes a control unit 41, a power supply circuit 44, and a charging cable 42. The control unit 41 and the power supply circuit 44 are built in a main body of the EVSE 40. The charging cable 42 is connected to the main body of the EVSE 40. The charging cable 42 may be always connected to the main body of the EVSE 40, or may be detachable from the main body of the EVSE 40. The charging cable 42 includes a connector 43 at the tip thereof and includes a power line inside. The control unit 41 controls the power supply circuit 44.

The vehicle 50 includes an inlet 110 and a charger-discharger 120 for contact charging. The inlet 110 is configured to receive the electric power supplied from the outside of the vehicle 50. The inlet 110 is configured such that the connector 43 of the charging cable 42 is connectable to the inlet 110. When the connector 43 of the charging cable 42 connected to the main body of the EVSE 40 is connected (plugged in) to the inlet 110 of the vehicle 50, the vehicle 50 is in a chargeable state (that is, a state in which the vehicle 50 can receive electric power supply from the EVSE 40). FIG. 1 shows only the inlet 110 and the charger-discharger 120 compatible with the electric power supply method of the EVSE 40. However, the vehicle 50 may include a plurality of inlets such that the vehicle 50 can support a plurality of types of electric power supply methods (for example, alternate current (AC) method and direct current (DC) method).

The charger-discharger 120 is located between the inlet 110 and the battery 130. The charger-discharger 120 includes a relay for switching connection and disconnection of an electric power path from the inlet 110 to the battery 130, and an electric power conversion circuit (both not shown). The electric power conversion circuit may include a bidirectional converter. Each of the relay and the electric power conversion circuit included in the charger-discharger 120 is controlled by the ECU 150. The vehicle 50 further includes a monitoring module 121 that monitors the state of the charger-discharger 120. The monitoring module 121 includes various sensors for detecting the state of the charger-discharger 120, and outputs the detection result to the ECU 150. In the present embodiment, the monitoring module 121 is configured to detect the voltage and current input to the electric power conversion circuit and the voltage and current output from the electric power conversion circuit. The monitoring module 121 is configured to be able to detect the charging electric power of the battery 130.

In the vehicle 50 in the chargeable state, external charging (that is, charging the battery 130 with the electric power supplied from the EVSE 40) and external electric power supply (that is, electric power supply from the vehicle 50 to the EVSE 40) are possible. The electric power for the external charging is supplied, for example, from the EVSE 40 to the inlet 110 through the charging cable 42. The charger-discharger 120 is configured to convert the electric power received by the inlet 110 into electric power suitable for charging the battery 130, and output the converted electric power to the battery 130. The electric power for the external electric power supply is supplied from the battery 130 to the charger-discharger 120. The charger-discharger 120 is configured to convert the electric power supplied from the battery 130 into electric power suitable for the external electric power supply and output the converted electric power to the inlet 110. When any of the external charging and the external electric power supply is executed, the relay of the charger-discharger 120 is closed (connected). When both of the external charging and the external electric power supply are not executed, the relay of the charger-discharger 120 is opened (disconnected).

The ECU 150 includes a processor 151, a random access memory (RAM) 152, a storage device 153, and a timer 154. The ECU 150 may be a computer. The processor 151 may be a central processing unit (CPU). The RAM 152 functions as a working memory for temporarily storing the data processed by the processor 151. The storage device 153 is configured to be able to store the stored information. The storage device 153 includes, for example, a read-only memory (ROM) and a rewritable non-volatile memory. In addition to a program, the storage device 153 stores information used in the program (for example, maps, mathematical formulas, and various parameters). In the present embodiment, as the processor 151 executes the program stored in the storage device 153, various controls in the ECU 150 are executed. However, the various controls in the ECU 150 are not limited to execution by software, and execution by dedicated hardware (electronic circuit) is possible. The number of processors included in the ECU 150 can be set as appropriate, and a processor may be prepared for each predetermined control.

The timer 154 is configured to notify the processor 151 of the arrival of the set time. At the time set in the timer 154, the timer 154 transmits a signal for notifying the arrival of the set time to the processor 151. In the present embodiment, a timer circuit is adopted as the timer 154. However, the timer 154 may be realized by software, instead of hardware (timer circuit). Further, the ECU 150 can acquire the current time using a real-time clock (RTC) circuit (not shown) built in the ECU 150.

The vehicle 50 further includes a traveling drive unit 140, an input device 161, a meter panel 162, a navigation system (hereinafter referred to as "NAVI") 170, a communication instrument 180, and drive wheels W. The drive system of the vehicle 50 is not limited to the front wheel drive shown in FIG. 1, and may be rear wheel drive or four-wheel drive.

The traveling drive unit 140 includes a power control unit (PCU) and a motor generator (MG) (both not shown), and is configured to cause the vehicle 50 to travel using the electric power stored in the battery 130. The PCU is configured to include, for example, an inverter, a converter, a relay (hereinafter referred to as a "system main relay (SMR)") (none of which are shown). The PCU is controlled by the ECU 150. The MG is, for example, a three-phase AC motor generator. The MG is driven by the PCU and is configured to rotate the drive wheels W. The PCU drives the MG using electric power supplied from the battery 130. Further, the MG is configured to generate regenerative power and supplies the generated electric power to the battery 130. The SMR is configured to switch connection and disconnection of the electric power path extending from the battery 130 to the MG. The SMR is closed (connected) when the vehicle 50 is traveling.

The input device 161 is a device that receives an input from a user. The input device 161 is operated by the user and outputs a signal corresponding to the operation by the user to the ECU 150. Examples of the input device 161 include various switches, various pointing devices, a keyboard, and a touch panel. The input device 161 may include a smart speaker that receives voice input.

The meter panel 162 is configured to display information related to the vehicle 50. The meter panel 162 displays various types of information related to the vehicle 50 measured by various sensors mounted on the vehicle 50, for example. The information displayed on the meter panel 162 may include at least one of the outside air temperature, the traveling speed of the vehicle 50, the SOC of the battery 130, the average electricity cost, and the mileage of the vehicle 50. The meter panel 162 is controlled by the ECU 150. The ECU 150 may display a message or a warning light for the user on the meter panel 162 when a predetermined condition is satisfied.

The NAVI 170 includes a processor, a storage device, a touch panel display, a global positioning system (GPS) module (none of which are shown). The storage device stores map information. The touch panel display receives an input from the user and displays maps and other information. The GPS module is configured to receive signals from GPS satellites (hereinafter referred to as "GPS signals"). The NAVI 170 can identify the position of the vehicle 50 using the GPS signals. The NAVI 170 is configured to perform a route search for finding a travel route (for example, the shortest route) from the current position of the vehicle 50 to the destination based on the input from the user, and display the travel route found by the route search on the map.

The communication instrument 180 includes various communication interfaces (I/Fs). The ECU 150 is configured to communicate with an EMS 60 (FIG. 3) that will be described later via the communication instrument 180. Further, the ECU 150 is configured to perform wireless communication with a server 30B (FIG. 3) that will be described later via the communication instrument 180.

Figure 2:
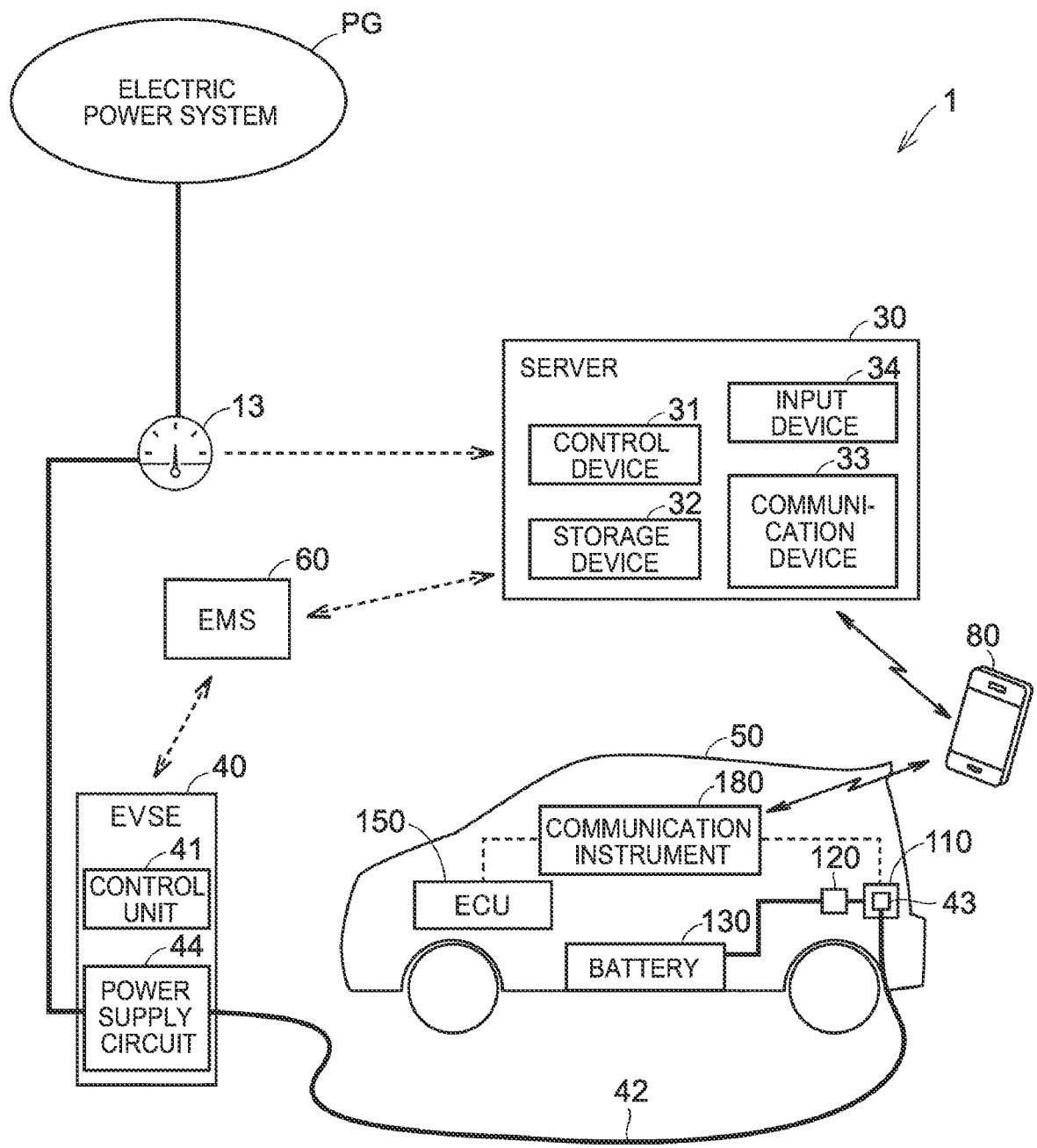
FIG. 2 is a diagram showing a communication mode of a server according to a first embodiment.

FIG. 2 is a diagram showing a communication mode of the third server 30 according to a first embodiment. With reference to FIG. 2, an electric power management system 1 includes an electric power system PG, a third server 30, the EVSE 40, the vehicle 50, and a mobile terminal 80. The electric power system PG and the third server 30 according to the present embodiment correspond to an example of a "power network" and an example of a "server" according to the present disclosure, respectively.

The vehicle 50 has the configuration shown in FIG. 1. In the present embodiment, AC electric power supply equipment that provides AC electric power is adopted as the EVSE 40. The charger-discharger 120 is provided with a circuit compatible with the AC electric power supply equipment. However, the EVSE 40 is not limited to the above, and may be DC electric power supply equipment that provides DC electric power. The charger-discharger 120 may be provided with a circuit compatible with the DC electric power supply equipment.

The mobile terminal 80 corresponds to a mobile terminal carried by the user of the vehicle 50. In the present embodiment, a smartphone equipped with a touch panel display is adopted as the mobile terminal 80. However, the present disclosure is not limited to this, and any mobile terminal can be adopted as the mobile terminal 80, and a tablet terminal, a wearable device (for example, a smart watch), an electronic key, a service tool or the like can also be adopted.

The electric power system PG is an electric power network provided by an electricity business operator (for example, an electric power company). The electric power system PG is electrically connected to a plurality of sets of EVSE (including the EVSE 40), and supplies the AC electric power to each set of the EVSE. The power supply circuit 44 built in the EVSE 40 is controlled by the control unit 41 to convert the electric power supplied from the electric power system PG into electric power suitable for the external charging. The power supply circuit 44 may include a sensor for detecting the charging electric power.

In the vehicle 50 in the chargeable state, the relay of the charger-discharger 120 is closed such that the battery 130 is electrically connected to the electric power system PG. The external charging of the battery 130 is performed by supplying the electric power from the electric power system PG to the battery 130 via the power supply circuit 44, the charging cable 42, and the charger-discharger 120.

The third server 30 does not communicate directly with the vehicle 50. That is, the third server 30 does not wirelessly communicate with the vehicle 50. The third server 30 communicates with the vehicle 50 via the EMS 60. The EMS 60 communicates with the vehicle 50 via the EVSE 40 in accordance with a command from the third server 30. The communication instrument 180 mounted on the vehicle 50 is configured to communicate with the EVSE 40 via the charging cable 42. The communication method between the EVSE 40 and the vehicle 50 is any communication method, and may be, for example, controller area network (CAN) or power line communication (PLC). The standard for communication between the EVSE 40 and the vehicle 50 may be International Organization for Standardization (ISO)/International Electrotechnical Commission (IEC) 15118 or IEC 61851.

In the present embodiment, the communication instrument 180 and the mobile terminal 80 are configured to communicate wirelessly with each other. The communication between the communication instrument 180 and the mobile terminal 80 may be short-range communication (for example, direct communication in and around the vehicle) such as Bluetooth (registered trademark).

The third server 30 is configured to be communicable with the mobile terminal 80. Predetermined application software (hereinafter, simply referred to as "application") is installed in the mobile terminal 80. The mobile terminal 80 is carried by the user of the vehicle 50, and can transmit and receive information to and from the third server 30 through the above application. The user can operate the above application through, for example, the touch panel display of the mobile terminal 80. The user can transmit, for example, the scheduled departure time of the vehicle 50 to the third server 30 by operating the above application.

The third server 30 includes a control device 31, a storage device 32, a communication device 33, and an input device 34. The control device 31 includes a processor and a storage device, and is configured to execute predetermined information processing and control the communication device 33. The storage device 32 is configured to be able to store various types of information. The communication device 33 includes various communication I/Fs. The control device 31 is configured to communicate with the outside through the communication device 33. The input device 34 is a device that receives an input from the user. The input device 34 outputs the input from the user to the control device 31.

Figure 3:
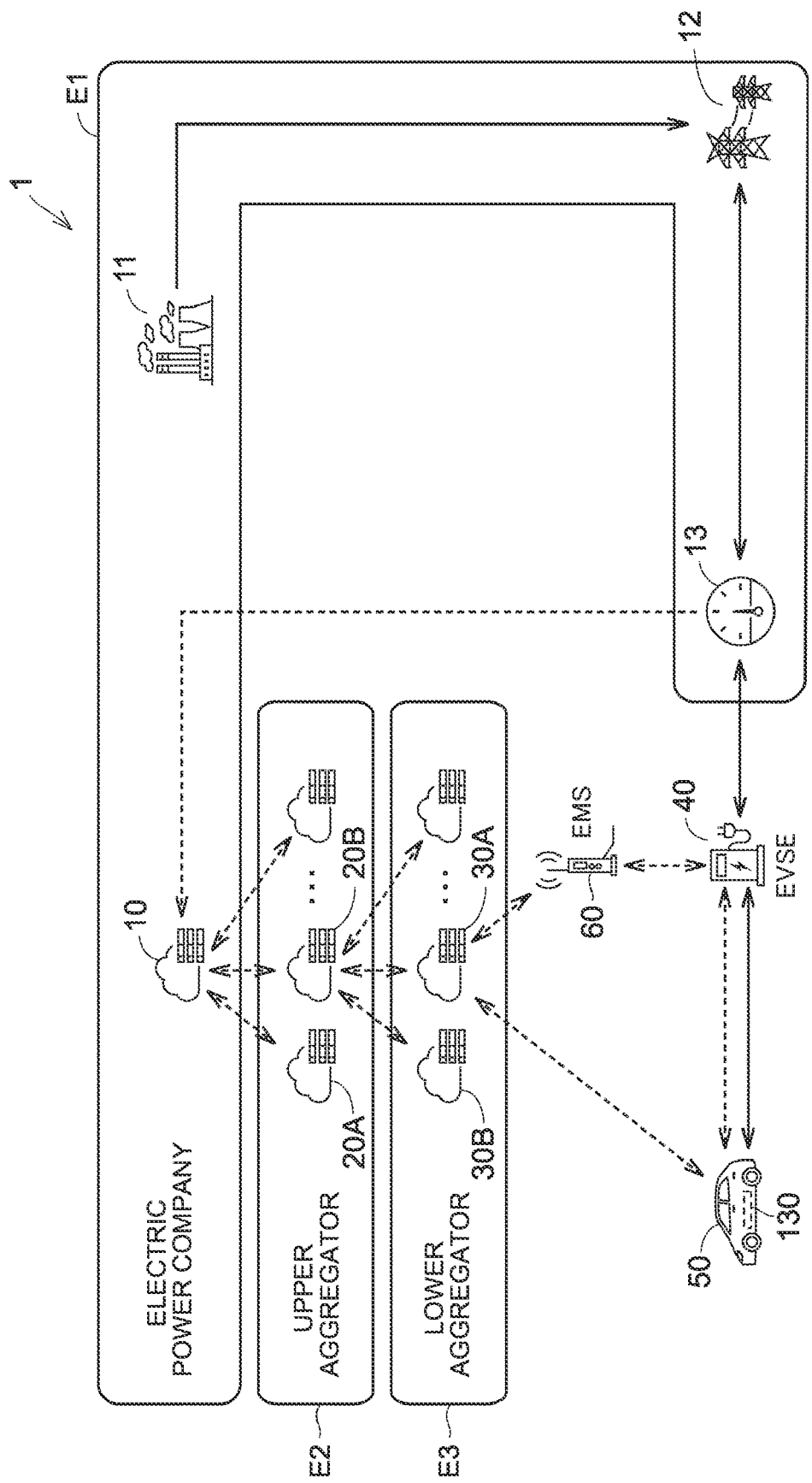
FIG. 3 is a diagram showing a schematic configuration of an electric power management system according to the present embodiment.

FIG. 3 is a diagram showing a schematic configuration of the electric power management system 1 according to the present embodiment. In the present embodiment, the electric power management system 1 functions as a virtual power plant (VPP). The VPP is a mechanism that bundles a large number of distributed energy resources (hereinafter, also referred to as "distributed energy resources (DER)") by advanced energy management technology using Internet of Things (IoT), and causes these DERs to function as if the DERs serve as a single power plant by remotely and integratedly controlling the DERs. In the electric power management system 1, the VPP is realized by energy management using an electrified vehicle (for example, the vehicle 50 shown in FIG. 1).

The electric power management system 1 is a vehicle grid integration (VGI) system. The electric power management system 1 includes a plurality of electrified vehicles and a plurality of sets of EVSE (only one for each is shown in FIG. 3). The number of electrified vehicles and the sets of EVSE included in the electric power management system 1 is independently arbitrary, and may be 10 or more, or 100 or more. The electric power management system 1 may include at least one of a POV and a MaaS vehicle. The POV is a personally owned vehicle. The MaaS vehicle is a vehicle managed by a mobility as a service (MaaS) business operator. The electric power management system 1 may include at least any one of non-public EVSE that can be used only by a specific user (for example, home EVSE) and public EVSE that can be used by an unspecified number of users. The mobile terminal 80 shown in FIG. 2 is carried by each user of the vehicle 50.

With reference to FIG. 2 and FIG. 3, the electric power management system 1 includes an electric power company E1, an upper aggregator E2 that contacts the electric power company E1, and a lower aggregator E3 that contacts the consumer.

The electric power company E1 also serves as an electric power generation business operator and an electric power transmission and distribution business operator. The electric power company E1 constructs an electric power network (that is, the electric power system PG shown in FIG. 2) by a power plant 11 and an electric power transmission and distribution facility 12, and maintains and manages the electric power system PG by a first server 10. The power plant 11 is provided with an electric power generation device for generating electricity, and is configured to supply the electric power generated by the electric power generation device to the electric power transmission and distribution facility 12. An electric power generation method of the power plant 11 is any method. The electric power generation method of the power plant 11 may be any of thermal power generation, hydroelectric power generation, wind power generation, nuclear power generation, and solar power generation. The electric power transmission and distribution facility 12 includes a transmission line, a substation, and a distribution line, and is configured to transmit and distribute electric power supplied from the power plant 11.

A smart meter 13 is configured to measure electric power consumption every predetermined time (for example, every 30 minutes), store the measured electric power consumption, and transmit the measured electric power consumption to the first server 10. The smart meter 13 is provided for each consumer (for example, an individual or a company) that uses electric power. The first server 10 acquires the electric power consumption for each consumer from the smart meter 13 of each consumer. The electric power company E1 may receive an electricity bill in accordance with the electric power consumption from each consumer. In the present embodiment, the electric power company corresponds to a manager of the electric power system PG.

The electricity business operator that bundles the DERs and provides energy management services is referred to as an "aggregator". The electric power company E1 can adjust the electric power of the electric power system PG by cooperating with the aggregator, for example. The upper aggregator E2 includes a plurality of servers (for example, servers 20A, 20B). Each server included in the upper aggregator E2 belongs to a different business operator. A lower aggregator E3 includes a plurality of servers (for example, servers 30A, 30B). Each server included in the lower aggregator E3 belongs to a different business operator. Hereinafter, each server included in the upper aggregator E2 will be referred to as a "second server 20", and each server included in the lower aggregator E3 will be referred to as a "third server 30", except for the case where the servers will be described separately. The numbers of second and third servers 20 and 30 are independent and arbitrary, and may be five or more, or 30 or more.

In the present embodiment, one first server 10 requests energy management to a plurality of servers 20, and each second server 20 requested by the first server 10 requests energy management to a plurality of third servers 30. Further, each third server 30 requested by the second server 20 requests energy management to a plurality of DER users. The electric power company E1 can request energy management to many consumers (for example, users of the vehicles 50) using the hierarchical structure above (tree structure). The request may be made by demand response (DR).

When the third server 30 receives a request for energy management from the second server 20, the third server 30 selects the DER for responding to the request from the DERs registered in the server 30. The DER selected as described above will be also referred to as "EMDER" below.

The third server 30 manages energy in a managed area. The area managed by the third server 30 may be one city (for example, a smart city), a factory, or a university campus. The aggregator concludes a contract related to energy management with the DER user present in the managed area of the third server 30. The user who has signed this contract can receive a predetermined incentive by causing the DER to perform energy management in accordance with the request from the aggregator. In addition, the user who approves to comply with the request but does not comply with the request is subject to a predetermined penalty based on the above contract. The DER and its users whose energy management is obliged by the contract are registered in the third server 30.

After selecting the EMDER, the third server 30 transmits a command to each EMDER. According to this command, energy management (for example, supply and demand adjustment of the electric power system PG) that complies with the request from the second server 20 is performed.

The third server 30 measures the electric energy adjustment amount for each EMDER (for example, the charge electric energy and/or the discharge electric energy in a predetermined period) by a predetermined watthour meter. The electric energy adjustment amount may be used to calculate the incentive. The predetermined watthour meter may be the smart meter 13 or a watthour meter mounted on the vehicle (for example, the monitoring module 121 shown in FIG. 1). The watthour meter may be installed at any location. The EVSE 40 may include a built-in watthour meter. The watthour meter may be attached to a portable charging cable.

In the present embodiment, the third server 30 is configured to receive the detection value of the smart meter 13 from the first server 10. However, the present disclosure is not limited to this, and the third server 30 may be configured to directly acquire the detection value of the smart meter 13 (without intervening the first server 10).

The smart meter 13 is configured to measure the electric energy supplied from the electric power system PG shown in FIG. 2 (that is, the electric power network constructed by the power plant 11 and the electric power transmission and distribution facility 12) to the EVSE 40. In the present embodiment, the EVSE 40 and the EMS 60 are installed in one residence or business establishment (for example, a factory or commercial facility). The EMS 60 is, for example, a home energy management system (HEMS), a factory energy management system (FEMS), or a building energy management system (BEMS). The smart meter 13 measures the electric energy supplied from the electric power system PG to the residence or business establishment (that is, the electric energy used in the residence or business establishment).

When the third server 30 receives a request for energy management from the second server 20, the third server 30 performs energy management through charging of the battery 130 by transmitting a charge start command to the vehicle 50 via the EMS 60 and the EVSE 40. Further, the third server 30 is configured to perform wireless communication with the vehicle 50.

As described above, when the VPP is configured using a large number of vehicles 50 that are BEVs, there arises an issue that it is difficult to predict and adjust the supply and demand of electric power.

Therefore, the electric power management system 1 is a system that performs an exchange of electric power with the electric power system PG of the electric power company E1 that is a counterparty of the exchange of the electric power, and includes a plurality of the vehicles 50, each including the battery 130, and first, second, and third servers 10, 20, and 30 that manage the exchange of the electric power between the battery 130 of each of the vehicles 50 and the electric power system PG. The first, second, and third servers 10, 20, and 30 manage the exchange of the electric power for each vehicle group in which the vehicles 50 are bundled, and configure the vehicle groups in advance such that distributions of the electric power supply and demand characteristics of the batteries 130 of the vehicles 50 included in the vehicle groups are the same or similar.

With the above, the exchange of the electric power is managed for each of the vehicle groups configured in advance such that distributions of the electric power supply and demand characteristics of the batteries 130 of the vehicles 50 included in the respective vehicle groups are the same or similar, whereby the exchange of the electric power can be managed as the average of the vehicles 50, compared to the case where the exchange of the electric power is managed for each of the vehicles 50. As a result, it is possible to facilitate prediction and adjustment of the supply and demand of electric power.

Figure 4:
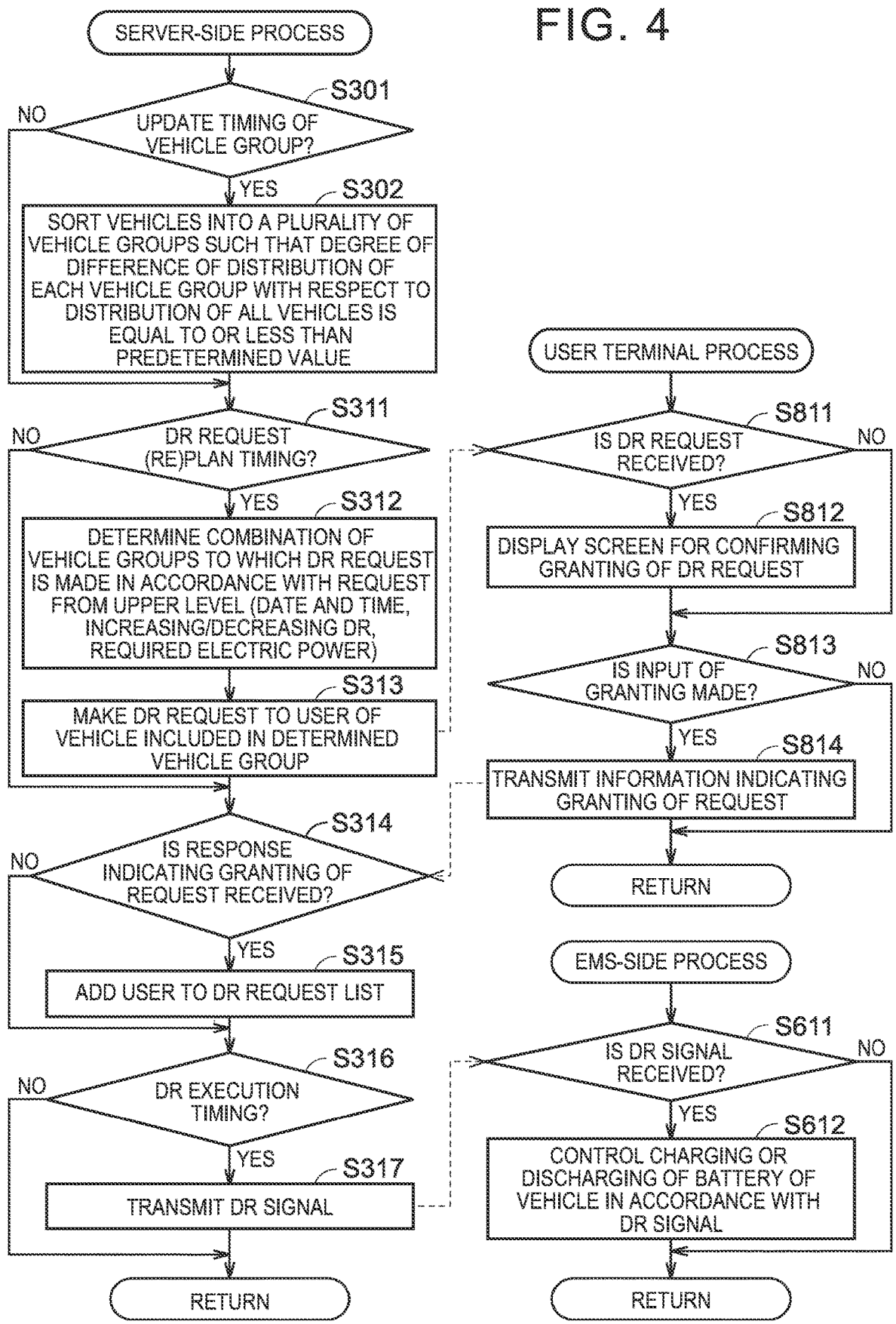
FIG. 4 is a flowchart showing the flow of processes for a virtual power plant (VPP) in the present embodiment.

FIG. 4 is a flowchart showing the flow of processes for the VPP in the present embodiment. With reference to FIG. 4, a server-side process is called and executed at predetermined intervals from an upper-level process executed by the control device 31 of the third server 30. In the server-side process, first, the control device 31 determines whether the current time is the update timing of the vehicle group (step S301).

FIGS. 5A and 5B are histograms each showing the distribution of the number of vehicles for each charging electric energy for a predetermined period (for example, in one week) that is one of the electric power supply and demand characteristics of the vehicle 50. With reference to FIGS. 5A and 5B, FIG. 5A is a histogram of all of vehicles 50 managed by the third server 30. FIG. 5B is a histogram of the vehicle 50 included in a certain vehicle group X.

As shown in FIG. 5A, among all the vehicles 50 managed by the third server 30, the ratio of the vehicles 50 having the charging electric energy of 0 to a (kilowatts per hour (kWh)) for the predetermined period is b1(%). Similarly, the ratios of the vehicles 50 having the charging electric energy for the predetermined period being a to 2a, 2a to 3a, 3a to 4a, 4a to 5a, 5a to 6a, 6a to 7a, 7a to 8a, and 8a to 9a (kWh) are b2, b3, b4, b5, b6, b7, b8, and b9(%), respectively.

As shown in FIG. 5B, among the vehicles 50 included in the certain vehicle group X, the ratio of the vehicles 50 having the charging electric energy being 0 to a (kWh) for the predetermined period is c1(%). Similarly, the ratios of the vehicles 50 having the charging electric energy for the predetermined period being a to 2a, 2a to 3a, 3a to 4a, 4a to 5a, 5a to 6a, 6a to 7a, 7a to 8a, and 8a to 9a (kWh) are c2, c3, c4, c5, c6, c7, c8, and c9(%), respectively.

The vehicle group X is configured in advance such that the histogram of the vehicle group X is the same as or similar to the histogram of the charging electric energies of all of the vehicles 50 managed by the third server 30 for the predetermined time. Specifically, the vehicle group X is configured in advance such that an equation (1): a degree of difference $d=|b1-c1|+|b2-c2|+ \ldots +|b9-c9| \leq k$ (k is a positive predetermined number) is established. When the degree of difference=0, the histogram of the vehicle group X is the same as the histogram of all of the vehicles 50 managed by the third server 30. k is determined in advance by, for example, a design engineer of the electric power management system 1, the electric power company E1, the upper aggregator E2, or the lower aggregator E3 as a threshold value between a range in which the histogram of the vehicle group X and the histogram of the all of the vehicles 50 managed by the third server 30 are similar and a range in which the both are not similar.

Returning to FIG. 4, the update timing of the vehicle group in step S301 is the timing when the electric power supply and demand characteristics of each vehicle group are not the same or similar, and may be, for example, the timing when a predetermined number (for example, one) of the vehicles 50 managed by the third server 30 is added, or the timing when a change in the supply and demand characteristics of the vehicle 50 managed by the third server 30 reaches a predetermined standard. The predetermined number is, for example, the minimum number that affects the degree of difference d. The predetermined standard is, for example, the minimum standard that affects the degree of difference d. It should be noted that the update timing of the vehicle group includes the timing of configuring the vehicle group for the first time.

When the control device 31 of the third server 30 determines that the current time is the update timing of the vehicle group (YES in step S301), the control device 31 sorts all the vehicles managed by the third server 30 into a plurality of vehicle groups such that the degree of difference of the distribution of each vehicle group with respect to the distribution in the histogram of the all the vehicles managed by the third server 30 is equal to or less than a predetermined value (step S302). Note that, the number of vehicles 50 included in each vehicle group may be the same (for example, 100 for each vehicle group or 1000 for each vehicle group), or may be different numbers from each other (for example, 100 for a vehicle group A and 1000 for a vehicle group B).

When the control device 31 of the third server 30 determines that the current time is not the update timing of the vehicle group (NO in step S301), or after step S302, the control device 31 determines whether it is the timing to plan or replan a DR request (step S311). The timing to plan the DR request is, for example, the timing when the DR request is received from the upper aggregator E2. The timing to replan the DR request is the timing when the control device 31 determines that the planned DR request is not granted as planned.

When the control device 31 of the third server 30 determines that it is the timing to (re)plan the DR request (YES in step S311), the control device 31 determines a combination of the vehicle groups to which the DR request is made in accordance with the DR request from the upper level, such as the upper aggregator E2 (step S312). Information included in the DR request includes, for example, information indicating the date and time when the DR is performed, information indicating the distinction between an increasing DR and a decreasing DR, and information indicating the electric power required by the DR.

The DR request from the upper level is, for example, a first request example to suppress a demand for 15 megawatts (MW) by the decreasing DR during 1:00 pm to 3:00 pm on Mondays to Fridays from July to August, or a second request example to increase a demand for 9 (MW) by the increasing DR during 0:00 am to 5:00 am on Mondays to Fridays from January to February.

For example, in the case of the first request example, when the number of vehicles included in each vehicle group is 1000 (vehicles per group), an average of 10(%) in each vehicle group can participate in the DR, and each vehicle can supply the electric power of average 1.5 (kilowatts (kW) per vehicle), the average electric power that can be supplied by one vehicle group is 1000 (vehicles per group)×10(%)× 1.5 (kW per vehicle)=150 (kW per group). Therefore, a combination of the vehicle groups is determined as 100 groups by an equation as 15 (MW)/150 (kW per group)=100 (groups). With the above, it is possible to supply the electric power of 15 (MW) with the combination of 100 (groups), and suppression of the demand for 15 (MW) can be predicted.

Further, in the case of the second request example, when each vehicle can be charged with an electric power of average 3.0 (kW per vehicle), the average electric power that can be consumed by one vehicle group is 1000 (vehicles per group)×10(%)×3.0 (kW per vehicle)=300 (kW per group). Therefore, a combination of the vehicle groups is determined as 30 (groups) by an equation as 9 (MW)/300 (kW per group)=30 (groups). With the above, it is possible to consume the electric power of 9 (MW) with the combination of 30 (groups), and an increase in the demand for 9 (MW) can be predicted.

Next, the control device 31 of the third server 30 transmits information for making the DR request to the mobile terminal 80 of the user of the vehicle 50 included in the vehicle group determined in step S312 (step S313). The information for making the DR request includes, for example, the information indicating the date and time when the DR is performed, the information indicating the distinction between the increasing DR and the decreasing DR, and information indicating the electric power per vehicle 50 required by the DR.

A user terminal process is called and executed at predetermined intervals from an upper-level process executed by the CPU of the mobile terminal 80 in a VPP application. In the mobile terminal 80, the CPU of the mobile terminal 80 determines whether the information for making the DR request is received from the third server 30 by the VPP application executed in the background (step S811). When the CPU of the mobile terminal 80 determines that the DR request is received (YES in step S811), the CPU displays a screen on the display for confirming whether to grant the DR request (step S812). The screen for confirming whether to grant the DR request displays, for example, a button image for inputting the intention of granting.

When the CPU of the mobile terminal 80 determines that the DR request is not received (NO in step S811), or after step S812, the CPU determines whether the input to grant the DR request is made as the user taps the button image for inputting the intention of granting on the screen for confirming whether to grant the DR request (step S813).

When the CPU of the mobile terminal 80 determines that the input of granting is made (YES in step S813), the CPU transmits, to the third server 30, information indicating that the DR request is granted (step S814). When the CPU of the mobile terminal 80 determines that the input of granting is not made (NO in step S813), or after step S814, the CPU returns the process to be executed to the upper-level process of the caller of the present user terminal process.

The control device 31 of the third server 30 determines whether a response indicating that the DR request is granted is received from the mobile terminal 80 (step S314). When the control device 31 of the third server 30 determines that the response indicating that the DR request is granted is received (YES in step S314), the control device 31 adds information related to the user of the mobile terminal 80 from which the response is transmitted to a list of users who grant the DR request (step S315).

When the required number of users for securing the electric power required by the DR is not included in the DR request list by the predetermined period before the date and time when the DR indicated by the DR request from the upper level is performed, the control device 31 of the third server 30 executes the processes in steps S311 to S313 again.

When the control device 31 of the third server 30 determines that the response indicating that the DR request is granted is not received (NO in step S314), or after step S315, the control device 31 determines whether the current time is the timing to execute the DR indicated in the DR request (step S316).

When the control device 31 of the third server 30 determines that the current time is the timing to execute the DR (YES in step S316), a DR signal for starting execution of the DR is transmitted to the mobile terminal 80 of the user included in the DR request list (step S317). The DR signal includes, for example, information indicating the date and time when the DR is started, the information indicating the distinction between the increasing DR and the decreasing DR, and the information indicating the electric power per vehicle 50 required by the DR.

The user who has granted the DR request connects the connector 43 of the EVSE 40 designated in advance to the vehicle 50 to enable charging and discharging before the timing to execute the DR is reached.

An EMS-side process is called and executed at predetermined intervals from an upper-level process executed by the CPU of the EMS 60. In the EMS-side process, the CPU of the EMS 60 determines whether the DR signal is received from the third server 30 (step S611). When the CPU of the EMS 60 determines that the DR signal is received (YES in step S611), the CPU controls the EVSE 40 and the vehicle 50 to execute charging and discharging of the battery 130 of the vehicle 50 in accordance with the DR signal (step S612). The third server 30 acquires the charge-discharge electric power of the battery 130 of the vehicle 50 from the smart meter 13.

For example, when the DR distinction indicated by the DR signal is the decreasing DR, the EMS 60 transmits, to the EVSE 40 and the vehicle 50, a signal for starting charging of the vehicle 50 with the wattage of the electric power indicated by the DR signal. With the above, the EVSE 40 starts charging of the vehicle 50 with the specified electric power. As a result, with charging of the vehicle 50, it is possible to execute the decreasing DR by the specified electric power.

Further, when the DR distinction indicated by the DR signal is the increasing DR, the EMS 60 transmits, to the EVSE 40 and the vehicle 50, a signal for starting discharging from the vehicle 50 with the wattage of the electric power indicated by the DR signal. With the above, the EVSE 40 starts discharging from the vehicle 50 with the specified electric power. As a result, with discharging from the vehicle 50, it is possible to execute the increasing DR by the specified electric power.

When the DR distinction indicated by the DR signal is the increasing DR and the vehicle 50 is charged until immediately before the DR execution timing, the EMS 60 may transmit, to the EVSE 40 and the vehicle 50, a signal for reducing the charging electric power to the vehicle 50 by the wattage of the electric power indicated by the DR signal. With the above, it is possible to continue charging of the vehicle 50 with the electric power obtained by reducing the electric power specified by the DR signal from the charging electric power to the vehicle 50 using the EVSE 40. As a result, with reduction of the charging electric power to the vehicle 50, it is possible to execute the increasing DR by the specified electric power.

When the CPU of the EMS 60 determines that the DR signal is not received (NO in step S611), or after step S612, the CPU returns the process to be executed to the upper-level process of the caller of the EMS-side process.

Second Embodiment

In the first embodiment, as shown in FIG. 2, the third server 30 is configured to transmit a charge-discharge start command to the EMS 60 that manages the EVSE 40 to which the vehicle 50 is connected. In a second embodiment, the third server 30 is configured to transmit the charge-discharge start command to the EVSE 40 without intervening the EMS 60.

Figure 6:
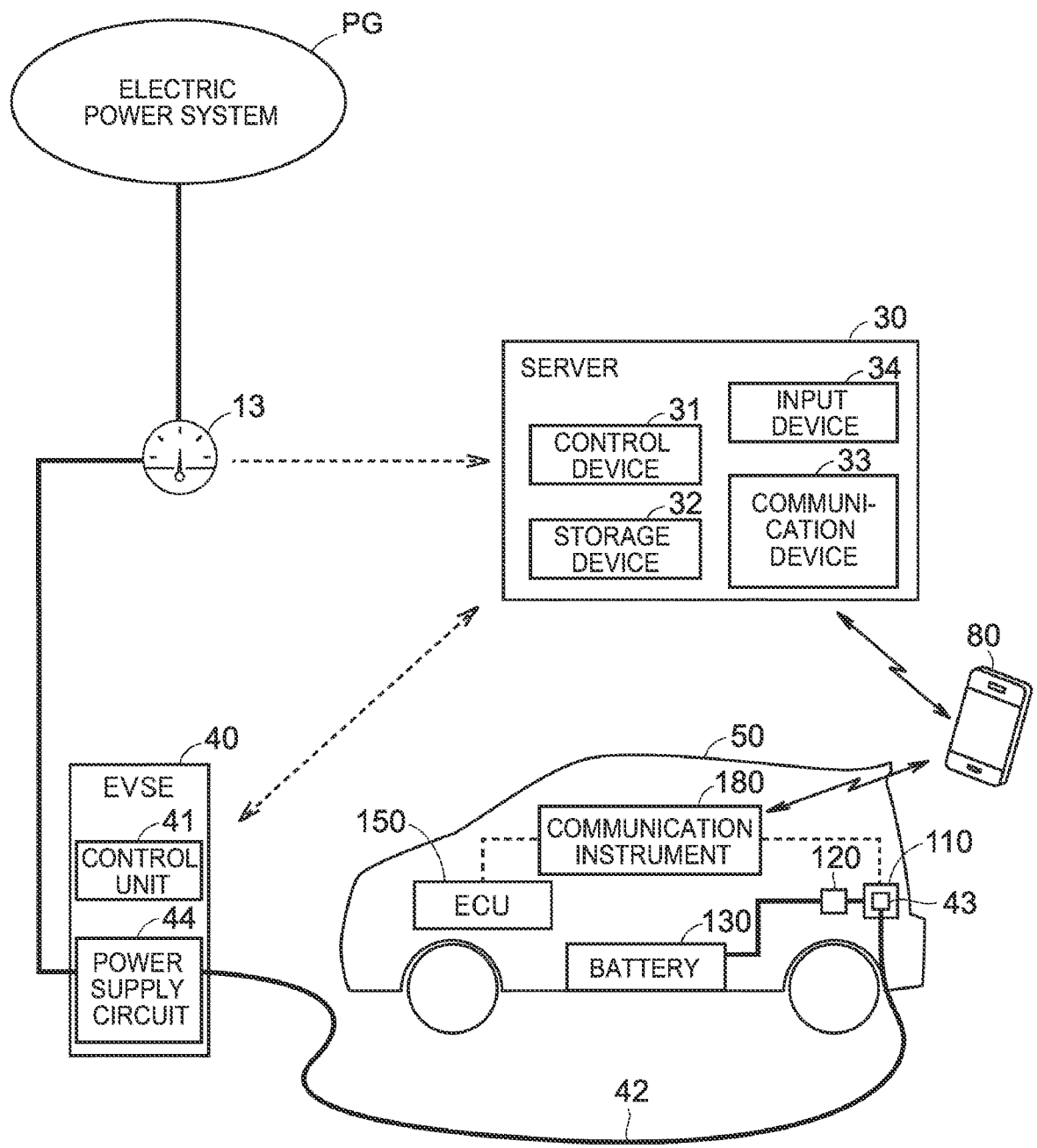
FIG. 6 is a diagram showing a communication mode of a server according to a second embodiment.

FIG. 6 is a diagram showing a communication mode of the third server 30 according to the second embodiment. With reference to FIG. 6, the third server 30 is configured to transmit the charge start command directly to the EVSE 40. The communication device 33 of the third server 30 is configured to be communicable with the EVSE 40. Further, the EVSE 40 includes a communication device (not shown) for communicating with the third server 30. The communication device of the EVSE 40 may be mounted on the main body of the EVSE 40 or may be provided on the charging cable 42. The communication method between the third server 30 and the EVSE 40 may be wired or wireless.

In the first embodiment, in step S317 shown in FIG. 4, the control device 31 of the third server 30 transmits the DR signal to the EMS 60, and the CPU of the EMS 60 controls the EVSE 40 and the vehicle 50 such that charging or discharging of the battery 130 of the vehicle 50 is executed in accordance with the DR signal.

In the second embodiment, in step S317 shown in FIG. 4, the control device 31 of the third server 30 transmits the DR signal to the EVSE 40, and the control unit 41 of the EVSE 40 controls the power supply circuit 44 of the EVSE 40 and the vehicle 50 such that charging or discharging of the battery 130 of the vehicle 50 is executed in accordance with the DR signal.

Note that, the EVSE 40 may be configured to be communicable with an EVSE management cloud. The communication protocol between the EVSE 40 and the EVSE management cloud may be open charge point protocol (OCPP).

Third Embodiment

In the first embodiment, as shown in FIG. 2, the third server 30 is configured to transmit a charge-discharge start command to the EMS 60 that manages the EVSE 40 to which the vehicle 50 is connected. In a third embodiment, the third server 30 is configured to transmit the charge-discharge start command directly to the vehicle 50 without intervening the EMS 60 or the EVSE 40.

Figure 7:
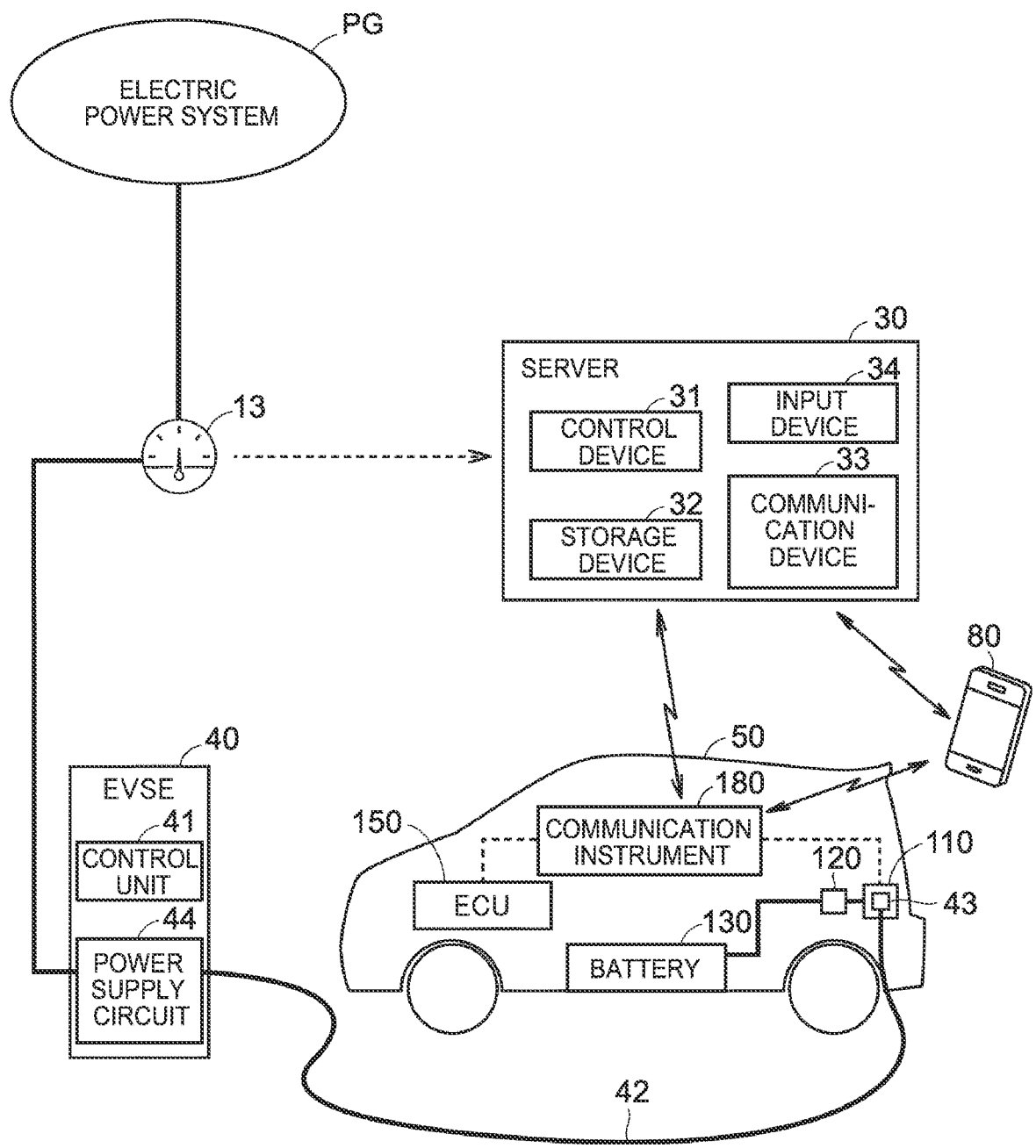
FIG. 7 is a diagram showing a communication mode of a server according to a third embodiment.

FIG. 7 is a diagram showing a communication mode of the third server 30 according to the third embodiment. With reference to FIG. 7, the third server 30 is configured to transmit the charge start command directly to the vehicle 50 via wireless communication. The third server 30 includes the communication device 33 for performing wireless communication with the vehicle 50. Further, the communication instrument 180 of the vehicle 50 includes a communication I/F for communicating with the third server 30. The communication instrument 180 may include a data communication module (DCM).

In the first embodiment, in step S317 shown in FIG. 4, the control device 31 of the third server 30 transmits the DR signal to the EMS 60, and the CPU of the EMS 60 controls the EVSE 40 and the vehicle 50 such that charging or discharging of the battery 130 of the vehicle 50 is executed in accordance with the DR signal.

In the third embodiment, in step S317 shown in FIG. 4, the control device 31 of the third server 30 transmits the DR signal to the vehicle 50, and the ECU 150 of the vehicle 50 controls the EVSE 40 and the charger-discharger 120 of the vehicle 50 such that charging or discharging of the battery 130 of the vehicle 50 is executed in accordance with the DR signal.

Other Modifications (1) In the above-described embodiments, the counterparty of the exchange of the electric power of the electric power management system 1 is the electric power company E1 as shown in FIG. 3. However, the counterparty of the exchange of the electric power is not limited to the electric power company such as a general electric power transmission and distribution business operator and a retail electricity business operator, and may be a renewable energy electric power generation business operator, or may be a consumer such as a factory, a building, or a household.

(2) In the above-described embodiments, the electric system of the counterparty of the exchange of the electric power is the electric power system PG that is an electric power network constructed by the power plant 11 and the electric power transmission and distribution facility 12, as shown in FIGS. 2 and 3. However, the electric system of the counterparty of the exchange of the electric power is not limited to this, and may be an electric power generation system of renewable energy such as a wind generator, a solar cell or a biomass power plant, a power grid, electric power storage equipment, or electric power transmission and reception equipment, may be electric equipment such as an electric device, electric power storage equipment, or electric power transmission and reception equipment at a factory, a building or a household, or may be a stationary battery.

(3) In the above-described embodiments, the server that manages the exchange of electric power between the battery 130 of each of the vehicles 50 and the electric system is the third server 30 of the lower aggregator E3. However, the server is not limited to the s third server 30, and may be the server of the upper aggregator E2, may be the first server 10 of the electric power company E1, or may be configured as an appropriate combination of the first, second, and third servers 10, 20, and 30.

(4) In the above-described embodiments, the main entities including the servers 10, 20, and 30 are the electric power company E1, the upper aggregator E2, and the lower aggregator E3, and the three parties are separate main entities. However, the present disclosure is not limited to this, and any of the servers 10, 20, and 30 may be provided in the same entity.

(5) In the above-described embodiments, the vehicle 50 is a movable machine equipped with an electric power storage device. However, the vehicle 50 is not limited to this, and other machines such as a drone and other flyable machines may be used as the vehicle 50.

(6) In the above-described embodiments, the vehicle 50 is a battery electric vehicle (BEV). However, the vehicle 50 is not limited to this. The vehicle 50 only needs to be a vehicle provided with the inlet 110 for exchanging electric power with the outside and an electric power storage device such as the battery 130. For example, the vehicle 50 may be a plug-in hybrid electric vehicle (PHEV).

(7) In the above-described embodiments, the charging and discharging equipment is the EVSE 40. However, the charging and discharging equipment is not limited to this. The charging and discharging equipment may be other equipment as long as the charging and discharging equipment can charge or discharge the vehicle 50 or the like. The charging and discharging equipment may be quick charging equipment such as that installed in a charging stand or ordinary charging equipment, may be charging equipment installed at home, or may be a charging cable that can be connected to an outlet such as a household outlet.

(8) In the above-described embodiments, the electric power supply and demand characteristics of the vehicle 50 are the charging electric energy for the predetermined period. However, the electric power supply and demand characteristics of the vehicle 50 are not limited to the above, and may be other characteristics. For example, the electric power supply and demand characteristics may be discharging electric energy for a predetermined period, may be a frequency of charging or discharging for a predetermined period, may be a frequency of granting the DR request, may be charging electric energy or discharging electric energy for each day for a predetermined period, may be the SOC at the time of starting charging or discharging, or may be a region in which the EVSE 40 that is charged and discharged on a daily basis is present (for example, any of the areas managed by the electric power company).

(9) In the above-described embodiments, the vehicle group is configured such that the degree of difference d between the histogram of all of the vehicles 50 managed by the third server 30 and the histogram of the vehicle group X is equal to or less than k (d≤k). However, the degree of difference d is not limited to this, and may be the degree of difference of the vehicle group X with respect to the reference vehicle group, or may be the degree of difference of the vehicle group X with respect to all other vehicle groups.

(10) In the above-described embodiments, the degree of difference d is calculated by the equation (1). However, the degree of difference d is not limited to this. The degree of difference d may be another index as long as the index indicates the degree of difference of the vehicle group X with respect to the reference, and may be, for example, an index indicating statistical difference, similarity, or distance.

(11) The above-described embodiments can be regarded as the disclosure of an electric power management system such as the electric power management system 1, can be regarded as the disclosure of an electric power management server such as the servers 10, 20, and 30 that manage the exchange of electric power, can be regarded as the disclosure of the vehicle 50 included in the electric power management system 1, and can be regarded as the disclosure of an electric power management method or an electric power management program in the electric power management system 1.

SUMMARY (1) As shown in FIGS. 1 to 3, 6, and 7, the electric power management system 1 is a system that performs an exchange of electric power with the electric power system PG of the electric power company E1 that is a counterparty of the exchange of the electric power, and includes a plurality of the vehicles 50, each including the battery 130, and servers 10, 20, and 30 that manage the exchange of the electric power between the battery 130 of each of the vehicles 50 and the electric power system PG. As shown in FIGS. 1 to 7, the servers 10, 20, and 30 manage the exchange of electric power for each vehicle group in which the vehicles 50 are bundled (for example, step S312 and step S313), and configures the vehicle groups in advance such that the distributions of the electric power supply and demand characteristics of the batteries 130 of the vehicles 50 included in the respective vehicle groups are the same or similar (for example, step S302).

With the above, the exchange of the electric power is managed for each of the vehicle groups configured in advance such that the distributions of the electric power supply and demand characteristics of the batteries 130 of the vehicles 50 included in the respective vehicle groups are the same or similar, whereby the exchange of the electric power can be managed as the average of the vehicles 50, compared to the case where the exchange of the electric power is managed for each of the vehicles 50. As a result, it is possible to facilitate prediction and adjustment of the supply and demand of electric power.

(2) As shown in FIGS. 4 and 5, the servers 10, 20, and 30 may formulate a plan for a combination of the vehicle groups capable of exchanging the electric power in accordance with the request for the exchange of the electric power with the electric power system PG of the electric power company E1 that is the counterparty (for example, step S312), request the users of the vehicles included in the vehicle group of the combination of the formulated plan for the exchange of the electric power in accordance with the request from the counterparty (for example, step S313), and execute a process for the exchange of the electric power between the electric power storage device of the vehicle of the requested user and the electric system of the counterparty (for example, step S317, step S611, and step S612).

With the above, the electric power can be exchanged between the battery 130 of the vehicle 50 of the requested user and the electric power system PG of the electric power company E1 in accordance with the request for the exchange of the electric power with the electric power system PG of the electric power company E1. As a result, it is possible to supply and demand the electric power in accordance with the request from the electric power company E1.

(3) As shown in FIG. 4, the exchange of the electric power between the battery 130 of the vehicle 50 and the electric power system PG of the electric power company E1 may be to supply the electric power from the battery 130 to the electric power system PG.

With the above, the electric power in accordance with the request from the electric power company E1 can be supplied from the battery 130 of the vehicle 50 included in the vehicle group to the electric power system PG of the electric power company E1.

(4) As shown in FIG. 4, the exchange of the electric power between the battery 130 of the vehicle 50 and the electric power system PG of the electric power company E1 may be to reduce supply of the electric power from the electric power system PG to the battery 130.

With the above, the supply of the electric power from the electric power system PG of the electric power company E1 to the battery 130 of the vehicle 50 included in the vehicle group can be reduced in accordance with the request from the electric power company E1.

(5) As shown in FIG. 4, the exchange of the electric power between the battery 130 of the vehicle 50 and the electric power system PG of the electric power company E1 may be to increase supply of the electric power from the electric power system PG to the battery 130.

With the above, the supply of the electric power from the electric power system PG of the electric power company E1 to the battery 130 of the vehicle 50 included in the vehicle group can be increased in accordance with the request from the electric power company E1.

It is also planned that the embodiments disclosed herein will be implemented in combination as appropriate. The embodiments disclosed herein should be considered to be exemplary and not restrictive in all respects. The scope of the present disclosure is shown by the scope of claims rather than the description of the embodiments above, and is intended to include all modifications within the meaning and the scope equivalent to the scope of claims.

What is claimed is:

1. An electric power management system that performs an exchange of electric power with an electric system of a counterparty of the exchange of the electric power, the electric power management system comprising:
    a plurality of vehicles, each including an electric power storage device; and
    a server that manages an exchange of the electric power between the electric power storage device of each of the vehicles and the electric system, wherein the server is configured to
        manage the exchange of the electric power for each vehicle group in which the vehicles are bundled,
        configure the vehicle groups in advance such that distributions of electric power supply and demand characteristics of the electric power storage devices of the vehicles included in the vehicle groups are the same or similar, and
        adjust a degree of difference of a distribution of each vehicle group with respect to a distribution of all the vehicles managed by the server to be equal to or less than a predetermined value,
            wherein the degree of difference is a total of absolute differences between an existence ratio of each vehicle group and an existence ratio of all the vehicles in each predetermined range of charging electric energy for a predetermined period in the distribution.

2. The electric power management system according to claim 1, wherein
    the server is configured to
        formulate a plan for a combination of the vehicle groups that are able to exchange the electric power in accordance with a request for the exchange of the electric power with the electric system of the counterparty,
        quest a user of the vehicle included in the vehicle group of the combination of the formulated plan for exchanging the electric power in accordance with the request from the counterparty, and
        execute a process for exchanging the electric power between the electric power storage device of the vehicle of the requested user and the electric system of the counterparty.

3. The electric power management system according to claim 2, wherein the exchange of the electric power between the electric power storage device of the vehicle and the electric system of the counterparty is to supply the electric power from the electric power storage device to the electric system.

4. The electric power management system according to claim 2, wherein the exchange of the electric power between the electric power storage device of the vehicle and the electric system of the counterparty is to reduce supply of the electric power from the electric system to the electric power storage device.

5. The electric power management system according to claim 2, wherein the exchange of the electric power between the electric power storage device of the vehicle and the electric system of the counterparty is to increase supply of the electric power from the electric system to the electric power storage device.

6. An electric power management server that is included in an electric power management system for performing an exchange of electric power with an electric system of a counterparty of the exchange of the electric power, and that includes a control unit that manages an exchange of the electric power between an electric power storage device of each of a plurality of vehicles and the electric system, wherein
    the control unit is configured to
        manage the exchange of the electric power for each vehicle group in which the vehicles are bundled,
        configure the vehicle groups in advance such that distributions of electric power supply and demand characteristics of the electric power storage devices of the vehicles included in the vehicle groups are the same or similar, and
        adjust a degree of difference of a distribution of each vehicle group with respect to a distribution of all the vehicles managed by the control unit to be equal to or less than a predetermined value,
            wherein the degree of difference is a total of absolute differences between an existence ratio of each vehicle group and an existence ratio of all the vehicles in each predetermined range of charging electric energy for a predetermined period in the distribution.

7. An electric power management method executed by a server that is included in an electric power management system for performing an exchange of electric power with an electric system of a counterparty of the exchange of the electric power, and that includes a control unit that manages an exchange of the electric power between an electric power storage device of each of a plurality of vehicles and the electric system, the electric power management method comprising:
    a step in which the control unit manages the exchange of the electric power for each vehicle group in which the vehicles are bundled; and
    a step in which the control unit configures the vehicle groups in advance such that distributions of electric power supply and demand characteristics of the electric power storage devices of the vehicles included in the vehicle groups are the same or similar, and
    a step in which the control unit adjusts a degree of difference of a distribution of each vehicle group with respect to a distribution of all the vehicles managed by the control unit to be equal to or less than a predetermined value,
        wherein the degree of difference is a total of absolute differences between an existence ratio of each vehicle group and an existence ratio of all the vehicles in each predetermined range of charging electric energy for a predetermined period in the distribution.

\* \* \* \* \*